United States Patent
Lunter et al.

(10) Patent No.: US 6,925,124 B2
(45) Date of Patent: Aug. 2, 2005

(54) UNIT FOR AND METHOD OF MOTION ESTIMATION AND IMAGE PROCESSING APPARATUS PROVIDED WITH SUCH MOTION ESTIMATION UNIT

(75) Inventors: Gerard Anton Lunter, Oxford (GB); Anna Pelagotti, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 458 days.

(21) Appl. No.: 10/277,587

(22) Filed: Oct. 22, 2002

(65) Prior Publication Data

US 2003/0086499 A1 May 8, 2003

(30) Foreign Application Priority Data

Oct. 25, 2001  (EP) ............................................ 01204086

(51) Int. Cl.⁷ ................................................. H04N 7/12
(52) U.S. Cl. .................................. 375/240.16; 348/699
(58) Field of Search ...................... 375/240.16, 240.12, 375/240.15; 348/394.1, 407.1, 409.1, 413.1, 416.1, 699, 700; 382/236, 238, 253; H04N 7/12

(56) References Cited

U.S. PATENT DOCUMENTS

| | | | | |
|---|---|---|---|---|
| 4,998,168 A | * | 3/1991 | Gillard | 348/451 |
| 5,469,850 A | * | 11/1995 | Iizuka et al. | 600/443 |
| 5,471,252 A | * | 11/1995 | Iu | 348/699 |
| 5,496,041 A | * | 3/1996 | Broussard | 473/578 |
| 5,600,252 A | * | 2/1997 | Rossi | 324/635 |
| 6,330,353 B1 | * | 12/2001 | Lai et al. | 382/147 |
| 6,744,933 B2 | * | 6/2004 | Lai et al. | 382/294 |

* cited by examiner

Primary Examiner—Nhon Diep

(57) ABSTRACT

The motion estimation unit (100) comprises a block-matcher (102) for calculating a start motion vector (110) by minimizing a predetermined cost function as a matching criterion for the block (116) of pixels with a further block of pixels (122) of a further image (120). The motion estimation unit (100) further comprises an optical flow analyzer (104) for calculating an update motion vector (111) based on the start motion vector (110) and which is designed to find the most appropriate set of optical flow equations corresponding to respective pixels of the block (116) of pixels. This is achieved by analyzing gradient vectors of optical flow equations for pixels of the block (116) of pixels. Finally the selector 106 of the motion estimation unit (100) selects the motion vector (126) by comparing the start motion vector (110) with the update motion vector (111).

11 Claims, 3 Drawing Sheets

Figure 1A:
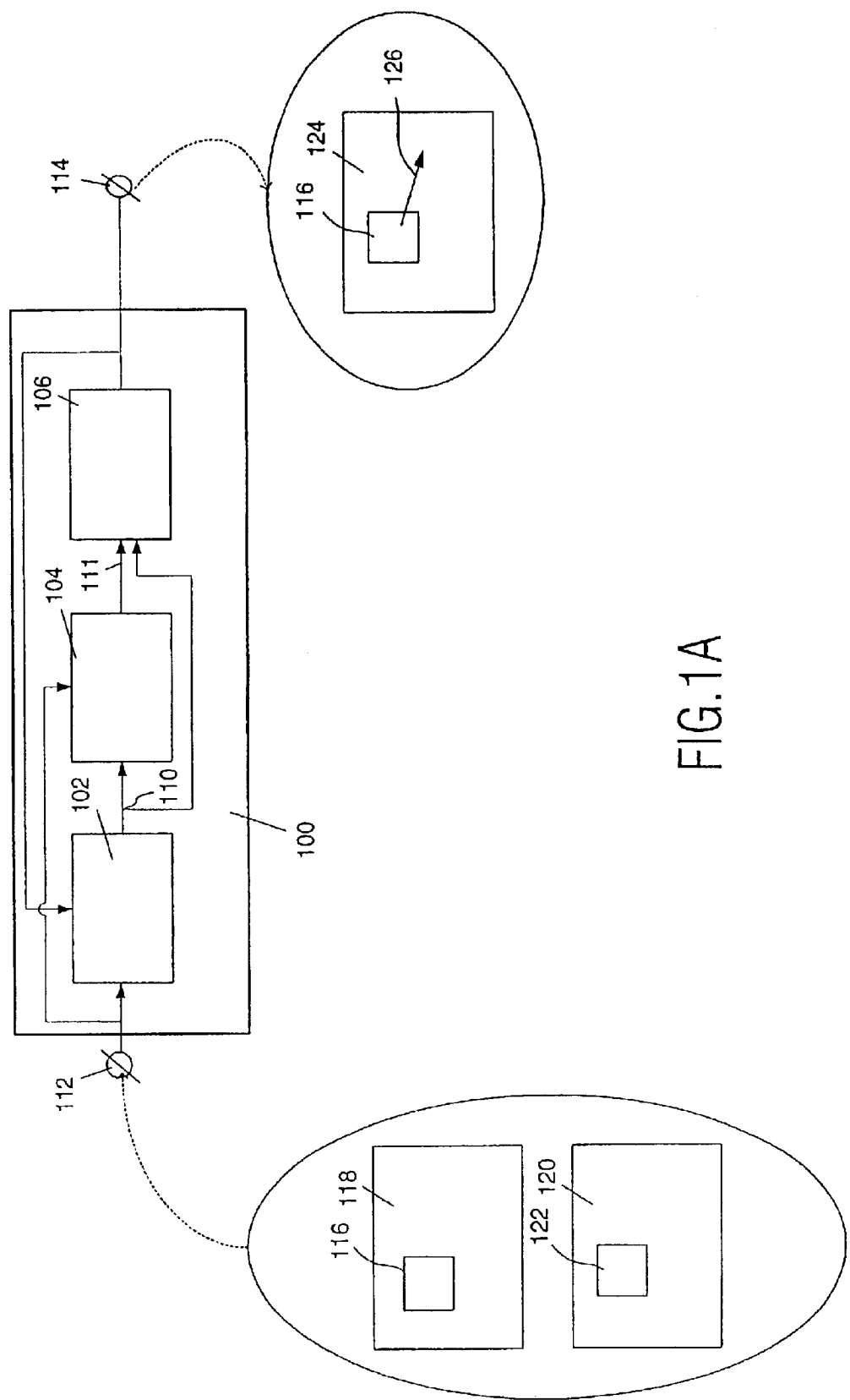

UNIT FOR AND METHOD OF MOTION ESTIMATION AND IMAGE PROCESSING APPARATUS PROVIDED WITH SUCH MOTION ESTIMATION UNIT

The invention relates to a motion estimation unit for generating a motion vector corresponding to a block of pixels of an image, comprising:
- a block-matcher for calculating a start motion vector by minimizing a predetermined cost function as a matching criterion for matching the block of pixels with a further block of pixels of a further image;
- an optical flow analyzer for calculating an update motion vector based on the start motion vector and based on a first optical flow equation for a first pixel of the block of pixels; and
- a selector to select as the motion vector, the start motion vector or the update motion vector, by comparing a first value of the matching criterion of the start motion vector with a second value of the matching criterion of the update motion vector.

The invention further relates to a method of generating a motion vector corresponding to a block of pixels of an image, comprising the steps of
- block-matching to calculate a start motion vector by minimizing a predetermined cost function as a matching criterion for matching the block of pixels with a further block of pixels of a further image;
- optical flow analysis to calculate an update motion vector based on the start motion vector and based on a first optical flow equation for a first pixel of the block of pixels; and
- selecting as the motion vector, the start motion vector or the update motion vector, by comparing a first value of the matching criterion of the start motion vector with a second value of the matching criterion of the update motion vector.

The invention further relates to an image processing apparatus comprising:
- receiving means for receiving a signal representing images to be displayed;
- such a motion estimation unit; and
- a motion compensated image processing unit.

For motion estimation, two main techniques are usually distinguished namely correspondence-based methods and optical flow-based methods. The former are suitable for large motion. Optical flow-based methods are suited for small motion, and are fast and accurate. The concept of optical flow-based methods is to use the Optical Flow Equation (OFE) to compute a motion vector. The OFE is simply the linearization of the equation describing the hypothesis that luminance L is constant along the motion trajectory. The constant-luminance hypothesis can be written as:

$$L(\bar{x}+t\bar{v},t) = \text{const.}, \quad (1)$$

for fixed $\bar{x}$, location and $\bar{v}$, speed. Differentiating with respect to t yields $$u\frac{\partial L}{\partial x} + v\frac{\partial L}{\partial y} = -\frac{\partial L}{\partial t} \quad (2)$$

with motion vector $\bar{v}=(u,v)$, or written differently $$\bar{v} \cdot \text{grad} L = -\frac{\partial L}{\partial t}, \quad (3)$$

Block-matching methods belong to the correspondence-based methods.

An embodiment of the motion estimation unit of the kind described in the opening paragraph is known from WO99/17256. In that document neighboring spatio-temporal candidates are used as input for a block-recursive matching process. In addition, a further update vector is tested against the best candidate of the block-recursive matching process. This update vector is computed by applying a local, pixel-recursive process to the current block, which uses the best candidate of the block-recursive matching process as a start vector. The pixel-recursive process is based on optical flow equations. The final output vector is obtained by comparing the update vector from pixel recursion with the start vector from the block-recursive process and by selecting the one with the best match. The motion estimation unit according to the prior art has two disadvantages related to the optical flow part. First, the pixel-recursive scheme leads to an essentially unpredictable memory access, which is undesirable for hardware implementations. Second, the technique chosen to solve the aperture problem makes the method vulnerable to noise. With aperture problem is meant that a single optical flow equation with two unknowns must be solved, i.e. in Equation 2 both u and v are unknown.

It is a first object of the invention to provide a motion estimation unit of the kind described in the opening paragraph which is designed to estimate a relatively high quality motion vector field.

It is a second object of the invention to provide a motion estimation method of the kind described in the opening paragraph to estimate a relatively high quality motion vector field.

It is a third object of the invention to provide an image processing apparatus of the kind described in the opening paragraph which is designed to perform motion compensated image processing based on a relatively high quality motion vector field.

The first object of the invention is achieved in that the optical flow analyzer is designed to select the first pixel and a second pixel from the block of pixels to solve a set of equations comprising the respective first optical flow equation and a second optical flow equation, with the selecting based on a first gradient vector of the first optical flow equation and a second gradient vector of the second optical flow equation. A major difference between the motion estimation units according to the prior art and according to the invention is that the optical flow analyzer of the motion estimation unit according to the invention is not recursive but block based. In the motion estimation unit according to the prior art a solution of the optical flow equation corresponding to each pixel of the block of pixels is estimated individually and used to estimate a solution of the optical flow equation corresponding to a next pixel. In the motion estimation unit according to the invention the pixels related with the most appropriate optical flow equations are searched and used. The idea is to select those optical flow equations for the set which result in the most reliable solution for $\bar{v}=(u,v)$. Typically two optical flow equations are required. This will give, except in degenerate situations, a unique solution for $\bar{v}=(u,v)$. By selecting the pixels appropriately, the effects of noise are suppressed. The result is a motion vector field which is relatively accurate. This has benefits, e.g. for coding applications because of less residual image data. Another application which profits from a high quality motion vector field is de-interlacing, as here the sub-pixel accuracy of the motion vector field is crucial. Another advantage is that good candidates stabilize the motion estimation unit, making it less likely that a wrong motion vector candidate, i.e. one which does not correspond to the true motion but which accidentally exhibits a low match error gets selected.

A general approach for solving optical flow equations is adding a smoothness constraint to overcome the aperture problem. An example of this approach is disclosed by Horn and Schunk in the article "Determining optical flow" in Artificial Intelligence 1981, vol. 17, pages 185–203. The smoothness constraint term is non-linear, necessitating an iterative process to solve the equations, which is more complex than the method according to the invention.

In an embodiment of the motion estimation unit according to the invention the optical flow analyzer is designed:

to calculate cross product values of pairs of gradient vectors of optical flow equations for a number of the pixels of the block of pixels, with a particular cross product value corresponding to a particular pair comprising the first gradient vector and the second gradient vector; and to select the first pixel and the second pixel if the particular cross product value is relatively large compared with the cross product values. The reliability of the solution depends on the length of the gradient vectors involved, and the angle between them. When they are short, or almost parallel, the influence of noise is amplified. Both length and parallelism is measured by the cross product which, for 2D vectors, is a scalar. The following notation is introduced:

The pixels in the block of pixels are indexed by a single index i or j.

$$X = \frac{\partial L}{\partial x}, Y = \frac{\partial L}{\partial y} \text{ and } T = \frac{\partial L}{\partial t};$$

$L_i$ is the luminance value of the pixel in the block with index i;

$X_i$ is the x-derivative of L at that pixel;

$Y_i$ is the y-derivative of L at that pixel;

$T_i$ is the t-derivative of L at that pixel;

$g_i:=(X_i,Y_i)$ is the gradient vector corresponding to pixel i

The cross product between the first gradient vector $g_i$ and the second gradient vector $g_j$ is:

$$g_i \times g_j = X_i Y_j - Y_i X_j = \|g_i\| \|g_j\| \sin(\text{angle}(g_i,g_j)) \quad (4)$$

A good reliability can be achieved by finding the pair of gradient vectors for which the absolute cross product value $g_i \times g_j$ is relatively large.

In an embodiment of the motion estimation unit according to the invention the optical flow analyzer is designed to calculate the cross product values for all possible pairs of the gradient vectors of the optical flow equations for the pixels of the block of pixels in order to select the first pixel and the second pixel. This embodiment is developed to take the most straightforward approach to find the pair of gradient vectors that actually maximizes the cross product value. The advantage is that it most probably gives the best result. However the time complexity of this straightforward approach is quadratic in the number of gradient vectors. E.g. it requires on the order of 2000 operations for a block of pixels with dimensions of 8×8.

In another embodiment of the motion estimation unit according to the invention the optical flow analyzer is designed:

to calculate length values of the gradient vectors of the optical flow equations for the number of the pixels of the block of pixels, with a particular length value related to the first gradient vector; and to select the first pixel if the particular length value is relatively large compared with the length values.

First a relatively long gradient vector is selected among the gradient vectors, according to the Euclidean norm. Preferably the longest gradient vector is selected. Then a second gradient vector, that maximizes the cross product value with the long gradient vector, is chosen. This optical flow analyzer according to the invention considers each gradient vector only twice, hence runs in linear time. It can be shown that the resulting cross product value falls short of the actual maximum by at most a factor two.

In another embodiment of the motion estimation unit according to the invention the optical flow analyzer is designed to:

repeatedly calculate three cross product values of three pairs from three gradient vectors of the optical flow equations for three pixels of the block of pixels;

repeatedly compare the three cross product values to determine which two of the three gradient vectors of the optical flow equations for the three pixels of the block of pixels result in a maximum cross product value;

repeatedly create new pairs of gradient vectors comprising the two of the three gradient vectors and a further gradient vector, if any;

select the first pixel and the second pixel corresponding to the two of the three gradient vectors.

Two "current" gradient vectors are kept in memory, say $g_A$ and $g_B$. They could be initialized with $g_1$ and $g_2$. For every new vector $g_k$ it is determined which of the three following cross product values is largest, in absolute value: $g_A \times g_B$, $g_k \times g_B$ or $g_A \times g_k$. The pair $(g_A, g_B)$ is then replaced by the pair corresponding to the largest cross product value. In other words repeatedly groups of three gradient vectors are taken to calculate cross product values. And from such a group one gradient vector will be replaced by a new gradient vector based on the cross product values. The algorithm performed by the this optical flow analyzer according to the invention is also linear but the optical flow analyzer requires only a single access to the gradient vectors. However there is no guarantee that the value of the found cross product will be within a constant factor of the actual maximum possible value.

In an embodiment of the motion estimation unit according to the invention the block-matcher is recursive. A relatively good motion estimation unit is known from the article "True-Motion Estimation with 3-D Recursive Search Block Matching" by G. de Haan et. al. in IEEE Transactions on circuits and systems for video technology, vol. 3, no. 5, October 1993, pages 368–379. That 3DRS block-matcher is in principle accurate up to ¼ pixels. This accuracy can be indeed achieved in large textured regions with translation motion, for example in a camera pan. However, to reach this accuracy in smaller regions, or in regions with more complicated motion, e.g. zooming, the 3DRS matcher has to select many update candidates, and this is undesirable as this in general leads to a degradation of spatial consistency. For this reason, update candidates are suppressed by means of penalties. This leads to a spatially and temporally stable vector field, but also to a sub-optimal accuracy. This embodiment according to the invention combines the good aspects of both a block-matching method and an optical flow-based method. The idea is that the block matcher is used to find the start vector field up to medium accuracy. The residual motion vector is small enough to allow an optical flow method to be applied by the optical flow analyzer. Compared with the 3DRS block-matcher according to the prior art, fewer update candidates have to be considered, as tracking of motion is done mainly by the optical flow analyzer. This improves the efficiency of the motion estimation unit.

Modifications of the image processing apparatus and variations thereof may correspond to modifications and variations thereof of the motion estimation unit described. The image processing apparatus may comprise additional components, e.g. receiving means for receiving a signal representing images and a display device for displaying the processed images. The motion compensated image processing unit might support one or more of the following types of image processing:

De-interlacing: Interlacing is the common video broadcast procedure for transmitting the odd or even numbered image lines alternately. De-interlacing attempts to restore the full vertical resolution, i.e. make odd and even lines available simultaneously for each image;

Up-conversion: From a series of original input images a larger series of output images is calculated. Output images are temporally located between two original input images; and Temporal noise reduction. This can also involve spatial processing, resulting in spatial-temporal noise reduction.

Figure 1B:
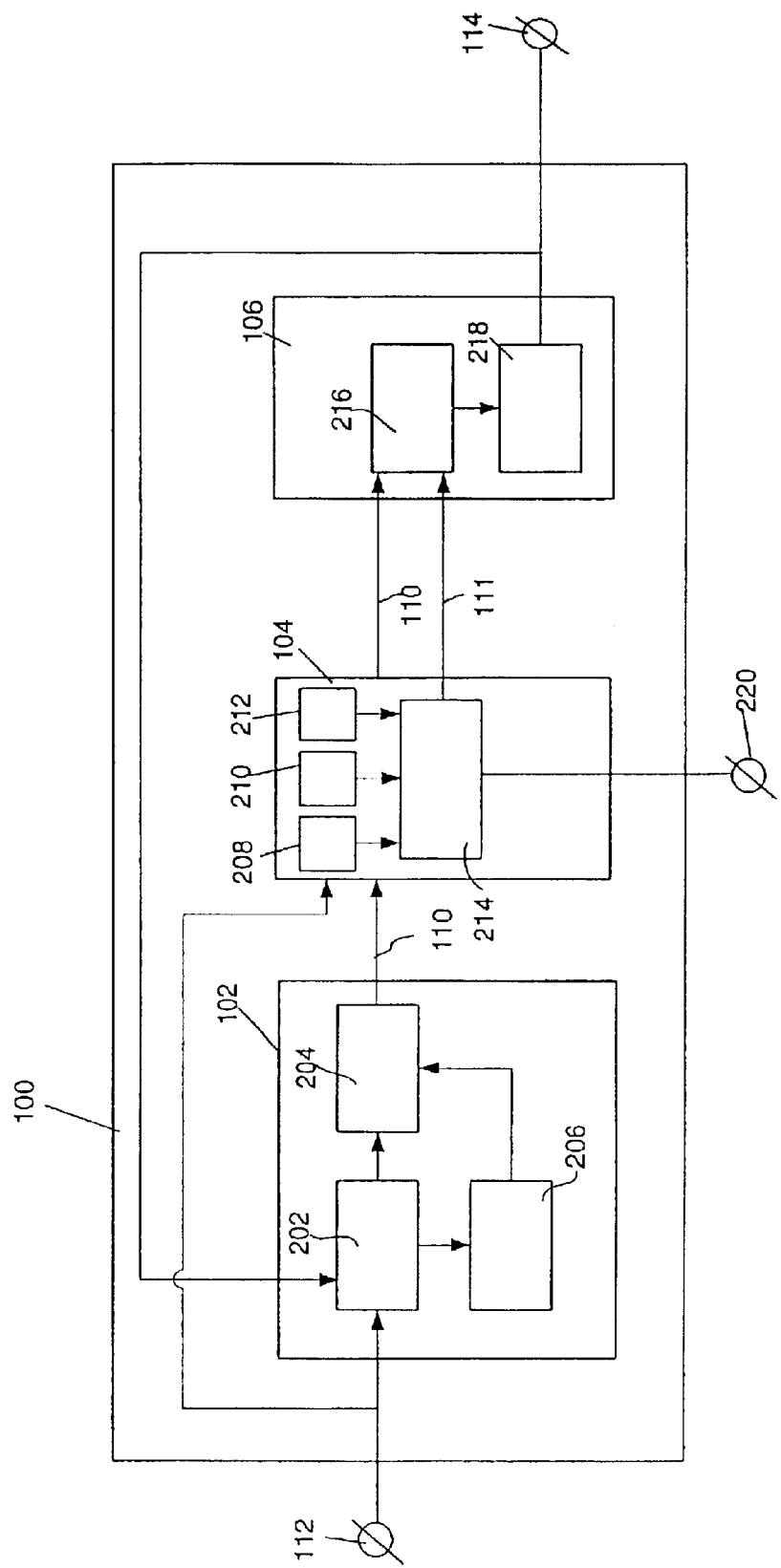
Figure 2:
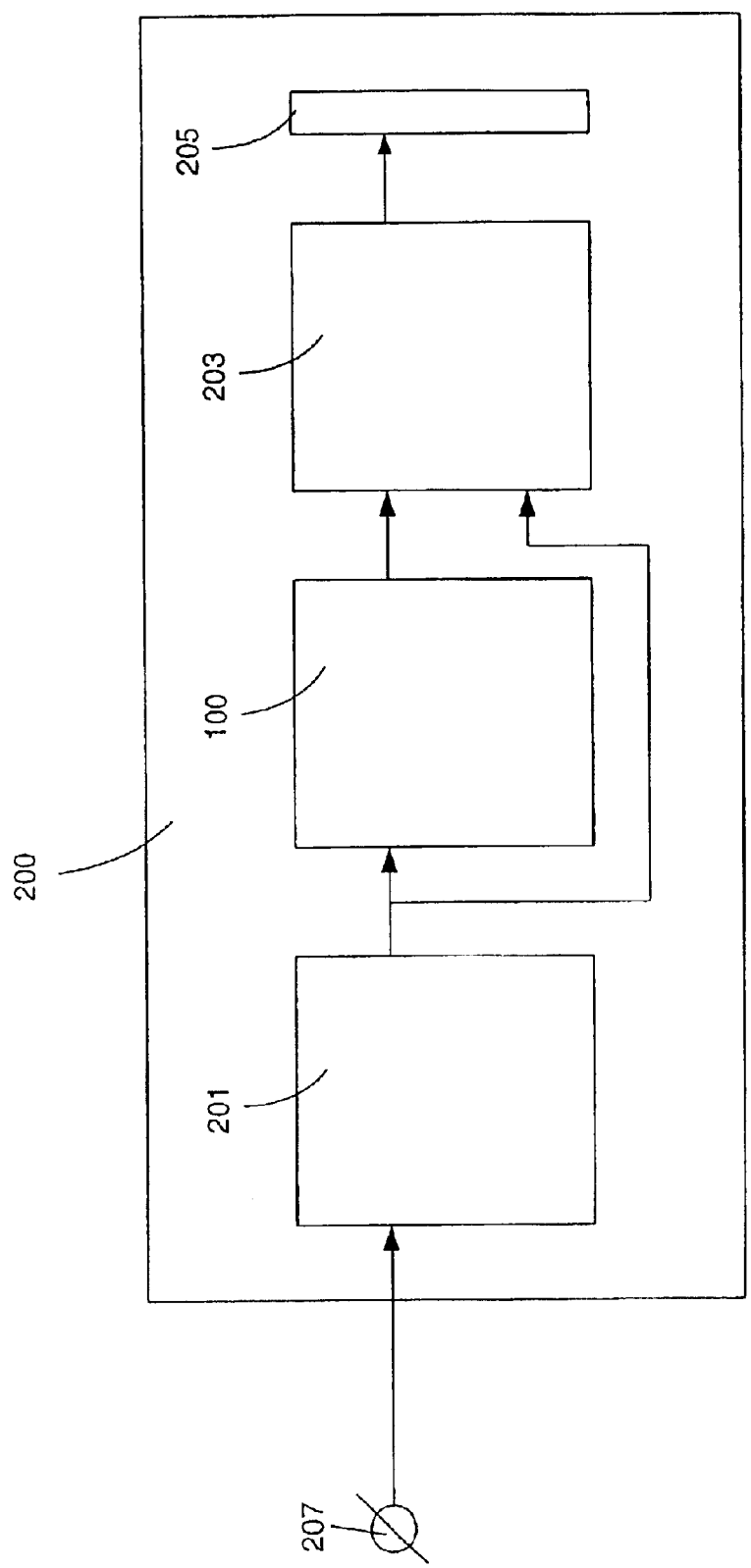

These and other aspects of the motion estimation unit, of the method and of the image processing apparatus according to the invention will become apparent from and will be elucidated with respect to the implementations and embodiments described hereinafter and with reference to the accompanying drawings, wherein:

FIG. 1A schematically shows an embodiment of the motion estimation unit;

FIG. 1B schematically shows an embodiment of the motion estimation unit in more detail; and FIG. 2 schematically shows an embodiment of the image processing apparatus; Corresponding reference numerals have the same meaning in all of the Figs.

FIG. 1A schematically shows an embodiment of the motion estimation unit 100 according to the invention. The motion estimation unit 100 is designed to generate a motion vector 126 corresponding to a block 116 of pixels of an image 118. All motion vectors of one image are called a motion vector field 124. The motion estimation unit 100 comprises:

a block-matcher 102 for calculating a start motion vector 110 by minimizing a predetermined cost function as a matching criterion for matching the block 116 of pixels with a further block of pixels 122 of a further image 120;

an optical flow analyzer 104 for calculating an update motion vector 111 based on the start motion vector 110 and which is designed to select a first pixel and a second pixel from the block 116 of pixels to solve a set of equations comprising the respective first optical flow equation and a second optical flow equation, with the selecting based on a first gradient vector of the first optical flow equation and a second gradient vector of the second optical flow equation; and a selector 106 to select as the motion vector 126, the start motion vector 110 or the update motion vector 111, by comparing a first value of the matching criterion of the start motion vector 110 with a second value of the matching criterion of the update motion vector 111.

The input of the motion estimator unit 100 comprises images and is provided at an input connector 112. The output of the motion estimator unit 100 are motion vector fields, e.g. 124 and is provided at an output connector 114.

FIG. 1B schematically shows the embodiment of the motion estimation unit 100 described in connection with FIG. 1A in more detail. The behavior of the block-matcher 102 is as follows. First the generating means 202 generates for the block 116 of pixels, a set of candidate motion vectors. Then the block-match error calculator 206 calculates for these candidate motion vectors the match errors. Then the selector 204 selects the start motion vector 110 from the set of candidate motion vectors on the basis of these match errors. This start motion vector 110 is selected because its match error has the lowest value. A match error being calculated by the block-match error calculator 206 corresponds to the SAD: sum of absolute luminance differences between pixels in the block 116 of pixels of image 118, and the pixels of a further block 122 in the next image 120 corresponding to the block 116 of pixels shifted by a candidate motion vector.

The behavior of the optical flow analyzer 104 is as follows. The gradient operators 208, 210 and 212 calculate the luminance gradients in x-, y- and time-direction, respectively. Typically the gradients of all pixels of a block of pixels are calculated. In the case that optical flow equations are used of only a portion of the block of pixels, less gradients have to be calculated. Gradient vectors are analyzed by the gradient analyzer 214 to find the most appropriate pixels and the corresponding optical flow equations. The result is a set of two instances of optical flow equations according to Equation 2. The set of equations is given in Equation 5. Notice that in this case the indices i and j indicate the most appropriate optical flow equations.

$$uX_i+vY_i+T_i=0$$

$$uX_j+vY_j+T_j=0 \quad\quad\quad (5)$$

Solving Equation 4 yields the update motion vector $\bar{v}=(u,v)$ 111:

$$u = \frac{T_iY_j - T_jY_i}{X_iY_j - Y_iX_j}$$

$$v = \frac{T_jX_i - T_iX_j}{X_iY_j - Y_iX_j}$$

Finally the two motion vectors, i.e. the start motion vector 110 being calculated by the block-matcher 102 and the update motion vector 111 being calculated by the optical flow analyzer 104 are analyzed by the selector 106 to select the motion vector 126. To achieve this, the block-match error calculator 216 calculates for both motion vectors the match errors, e.g. on the basis of the sum of absolute differences. Then the selector 218 selects the motion vector 126 on the basis of these match errors. The selected motion vector 126 is a possible motion vector candidate for other blocks. Hence the selected motion vector 126 is provided to the generating means 202 of the block-matcher 102.

The gradient analyzer 214 is developed to take the following approaches to search for the most appropriate optical flow equations:

For all possible pairs of gradient vectors of optical flow equation for a number of pixels of the block 116 of pixels the cross product values are calculated. The pair with the maximum cross product value corresponds with the most appropriate optical flow equations.

First the longest gradient vector is selected among the gradient vectors, according to the Euclidean norm. Then a second gradient vector that maximizes the cross product value with the long gradient vector is chosen.

Repeatedly groups of three gradient vectors are taken to calculate cross product values. From such a group one gradient vector will be replaced by a new gradient vector based on the cross product values. That means that the gradient vector which is not part of the pair with the maximum cross product value is replaced by a new gradient vector. Via control interface 220 one of these approaches can be selected.

FIG. 2 schematically shows elements of an image processing apparatus 200 comprising:

receiving means 201 for receiving a signal representing images to be displayed after some processing has been performed. The signal may be a broadcast signal received via an antenna or cable but may also be a signal from a storage device like a VCR (Video Cassette Recorder) or Digital Versatile Disk (DVD). The signal is provided at the input connector 207.

a motion estimator unit 100 as described in connection with FIG. 1A and FIG. 1B;

a motion compensated image processing unit 203; and a display device 205 or displaying the processed images. This display device is optional.

The motion compensated image processing unit 203 requires images and motion vectors as its input.

It should be noted that the above-mentioned embodiments illustrate rather than limit the invention and that those skilled in the art will be able to design alternative embodiments without departing from the scope of the appended claims. In the claims, any reference signs placed between parentheses shall not be constructed as limiting the claim. The word 'comprising' does not exclude the presence of elements or steps not listed in a claim. The word "a" or "an" preceding an element does not exclude the presence of a plurality of such elements. The invention can be implemented by means of hardware comprising several distinct elements and by means of a suitable programmed computer. In the unit claims enumerating several means, several of these means can be embodied by one and the same item of hardware. Notice that the functions of the block-match error calculators 216 and 206 are similar. Optionally one of these can perform both tasks. The same holds for the selectors 204 and 218.

What is claimed is:

1. A motion estimation unit (100) for generating a motion vector (126) corresponding to a block (116) of pixels of an image (118), comprising:

a block-matcher (102) for calculating a start motion vector (110) by minimizing a predetermined cost function as a matching criterion for matching the block (116) of pixels with a further block of pixels (122) of a further image (120);

an optical flow analyzer (104) for calculating an update motion vector (111) based on the start motion vector (110) and based on a first optical flow equation for a first pixel of the block (116) of pixels; and a selector (106) to select as the motion vector (126), the start motion vector (110) or the update motion vector (111), by comparing a first value of the matching criterion of the start motion vector (110) with a second value of the matching criterion of the update motion vector (111), characterized in that the optical flow analyzer (104) is designed to select the first pixel and a second pixel from the block (116) of pixels to solve a set of equations comprising the respective first optical flow equation and a second optical flow equation, with the selecting based on a first gradient vector of the first optical flow equation and a second gradient vector of the second optical flow equation.

2. A motion estimation unit (100) as claimed in claim 1, characterized in that the optical flow analyzer (104) is designed:

to calculate cross product values of pairs of gradient vectors of optical flow equations for a number of the pixels of the block (116) of pixels, with a particular cross product value corresponding to a particular pair comprising the first gradient vector and the second gradient vector; and to select the first pixel and the second pixel if the particular cross product value is relatively large compared with the cross product values.

3. A motion estimation unit (100) as claimed in claim 2, characterized in that the optical flow analyzer (104) is designed to calculate the cross product values for all possible pairs of the gradient vectors of the optical flow equations for the pixels of the block (116) of pixels in order to select the first pixel and the second pixel.

4. A motion estimation unit (100) as claimed in claim 2, characterized in that the optical flow analyzer (104) is designed:

to calculate length values of the gradient vectors of the optical flow equations for the number of the pixels of the block (116) of pixels, with a particular length value related to the first gradient vector; and to select the first pixel if the particular length value is relatively large compared with the length values.

5. A motion estimation unit (100) as claimed in claim 2, characterized in that the optical flow analyzer (104) is designed to:

repeatedly calculate three cross product values of three pairs from three gradient vectors of the optical flow equations for three pixels of the block (116) of pixels;

repeatedly compare the three cross product values to determine which two of the three gradient vectors of the optical flow equations for the three pixels of the block (116) of pixels result in a maximum cross product value;

repeatedly create new pairs of gradient vectors comprising the two of the three gradient vectors and a further gradient vector, if any;

select the first pixel and the second pixel corresponding to the two of the three gradient vectors.

6. A motion estimation unit (100) as claimed in claim 1, characterized in that the block-matcher (102) is recursive.

7. A method of generating a motion vector (126) corresponding to a block (116) of pixels of an image (118), comprising the steps of block-matching to calculate a start motion vector (110) by minimizing a predetermined cost function as a matching criterion for matching the block (116) of pixels with a further block of pixels (122) of a further image (120);

optical flow analysis to calculate an update motion vector (111) based on the start motion vector (110) and based on a first optical flow equation for a first pixel of the block (116) of pixels; and selecting as the motion vector (126), the start motion vector (110) or the update motion vector (111), by comparing a first value of the matching criterion of the start motion vector (110) with a second value of the matching criterion of the update motion vector (111), characterized in that in the optical flow analysis the first pixel and a second pixel from the block (116) of pixels are selected to solve a set of equations comprising the respective first optical flow equation and a second optical flow equation, with the selecting based on a first gradient vector of the first optical flow equation and a second gradient vector of the second optical flow equation.

8. An image processing apparatus (200) comprising:

receiving means (201) for receiving a signal representing an image (118) to be displayed;

a motion estimation unit (100) for generating a motion vector (126) corresponding to a block (116) of pixels of the image (118), comprising:

a block-matcher (102) for calculating a start motion vector (110) by minimizing a predetermined cost function as a matching criterion for matching the block (116) of pixels with a further block of pixels (122) of a further image (120);

an optical flow analyzer (104) for calculating an update motion vector (111) based on the start motion vector (110) and based on a first optical flow equation for a first pixel of the block (116) of pixels; and a selector (106) to select as the motion vector (126), the start motion vector (110) or the update motion vector (111), by comparing a first value of the matching criterion of the start motion vector (110) with a second value of the matching criterion of the update motion vector (111); and a motion compensated image processing unit (203), characterized in that the optical flow analyzer (104) is designed to select the first pixel and a second pixel from the block (116) of pixels to solve a set of equations comprising the respective first optical flow equation and a second optical flow equation, with the selecting based on a first gradient vector of the first optical flow equation and a second gradient vector of the second optical flow equation.

9. An image processing apparatus (200) as claimed in claim 8, characterized in that the motion compensated image processing unit (203) is designed to reduce noise in the image (118).

10. An image processing apparatus (200) as claimed in claim 8, characterized in that the motion compensated image processing unit (203) is designed to de-interlace the image (118).

11. An image processing apparatus (200) as claimed in claim 8, characterized in that the motion compensated image processing unit (203) is designed to perform an up-conversion.

* * * * *